United States Patent [19]

Hummert et al.

[11] 4,283,651

[45] Aug. 11, 1981

[54] SWITCHING CIRCUIT FOR HIGH CURRENT BRUSHES IN A DYNAMOELECTRIC MACHINE

[75] Inventors: George T. Hummert, Oakmont; Randall M. Garrett, Murrysville; Roy D. Schultz, Wilkinsburg, all of Pa.

[73] Assignee: Westinghouse Electric Corp., Pittsburgh, Pa.

[21] Appl. No.: 88,309

[22] Filed: Oct. 25, 1979

[51] Int. Cl.³ .............................................. H02K 27/22
[52] U.S. Cl. ................................. 310/223; 310/68 D; 310/148; 318/439
[58] Field of Search .............................. 310/219–223, 310/68 R, 68 D, 127, 148, 232, 233, 236, 237, 248, 249, 46; 318/361, 439

[56] References Cited

U.S. PATENT DOCUMENTS

| 263,149 | 8/1882 | Edison | 310/236 |
|---|---|---|---|
| 465,855 | 12/1891 | Hicks | 310/236 |
| 1,949,504 | 3/1934 | von Platen | 310/223 |
| 3,437,897 | 4/1969 | Lenny | 310/233 |
| 3,453,513 | 7/1969 | Bates | 310/220 |
| 3,906,321 | 9/1975 | Salihi | 318/439 |
| 3,940,644 | 2/1976 | Manz | 310/148 |

*Primary Examiner*—R. Skudy
*Attorney, Agent, or Firm*—F. J. Baehr, Jr.

[57] ABSTRACT

A switching circuit electrically connected to a brush and collector bar of a DC dynamoelectric machine utilizing a high current rectifier and a source of electromotive source which produces a current in the circuit which is generally equal to the current flowing between the brush and the collector bar and which can be forced to zero as the brush separates from the collector bar to reduce degradation of the trailing edges of the brushes and collector bars and improve the machine efficiency.

4 Claims, 4 Drawing Figures

SWITCHING CIRCUIT FOR HIGH CURRENT BRUSHES IN A DYNAMOELECTRIC MACHINE

BACKGROUND OF THE INVENTION

This invention relates to DC dynamoelectric machines and more particularly to one in which high currents are transmitted through brushes.

Conventional DC machines utilize electrographic or carbon brushes that carry a maximum current density of 50 to 100 amps per square inch with a corresponding voltage drop of approximately 1 volt. Typically conventional DC machines include small interpoles and interpole windings, located between the main stator poles used to generate voltages in the conductors undergoing commutation such that the conductor current reverses in a nearly linear manner. This is called linear commutation. Under these conditions, current and power densities are distributed uniformly throughout the brush volume. Slight deviations from ideal linear commutation produces non-uniform currents and power densities, which are easily accommodated by the bulk brush material.

A new generation of low voltage high current DC machines currently being developed requires current transfers through sliding contacts at 1,000 to 2,000 amps per square inch with a voltage drop of less than 200 millivolts. Such current transfer characteristics may be achieved by utilizing metal-graphite brushes operating either in air or possibly in a controlled atmosphere of humidified carbon dioxide. During a current switching interval, however, when the rotor bar current diminishes from the normal operating level to zero, the rotor bar leakage inductance induces an additional bar to brush voltage that tends to maintain a constant bar current. As the brush to bar contact area diminishes and the corresponding contact resistance increases, the contact power density increases dramatically from several hundred to several thousand or more watts per square inch. At such power densities along the brush to bar interface, the metal constituent of the metal graphite brushes melts and deposits on the collector bar surface. Thus, a thin depletion zone forms on the brush surface beginning at the trailing end and extending toward the leading end. The extent of the depletion appears to be a complicated function of surface filming, power density, and brush motion.

Such depletion is undesirable because of several reasons:
1. Brush contact resistance and hence brush voltage drop is increased.
2. Substantial metal depletion on the conductor bar leads to poor mechanical contact thereby increasing interface resistance. Deposition build-ups in the insulating gap between adjacent collector bars may lead to shorting of the bars.
3. Switching characteristics determined by depletion are highly load dependent due to the sensitivity to energy stored in rotor bar leakage inductance. Hence, trailing edge arcing at a given load current may or may not occur depending on the extent of depletion existing at the time of establishing the load current.
4. Due to the variable brush characteristics associated with depletion formation, machine performance predictions are at best approximations.

Although trailing edge arcing can be effectively eliminated by using a conventional electrographic brush at the trailing edge to absorb excessive bar leakage energy, this technique has not provided an entirely satisfactory solution to the depletion problem. Depletion of the metal graphite brushes still occur when used with a trailing edge electrographic brush. In addition, high power dissipation within the electrographic brush increases that brush's body temperature to unacceptable levels.

SUMMARY OF THE INVENTION

In general, a switching circuit in a DC dynamoelectric machine having a stator and a rotor, conductors in the rotor electrically connected to collector bars and brushes which intermittently make electrical and physical contact with the collector bars, when made in accordance with this invention comprises a first brush, a first collector bar, a first auxiliary brush disposed to contact the first collector bar before it separates from the first brush and a high current rectifier electrically connected in series with the first brush and the first auxiliary brush. The switching circuit also comprises a source of electromotive force, which produces a current in the circuit that is generally equal to the current flowing between the collector bar and the first brush and that is generally forced to zero as the first brush separates from the collector bar.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENTS

Figure 1:
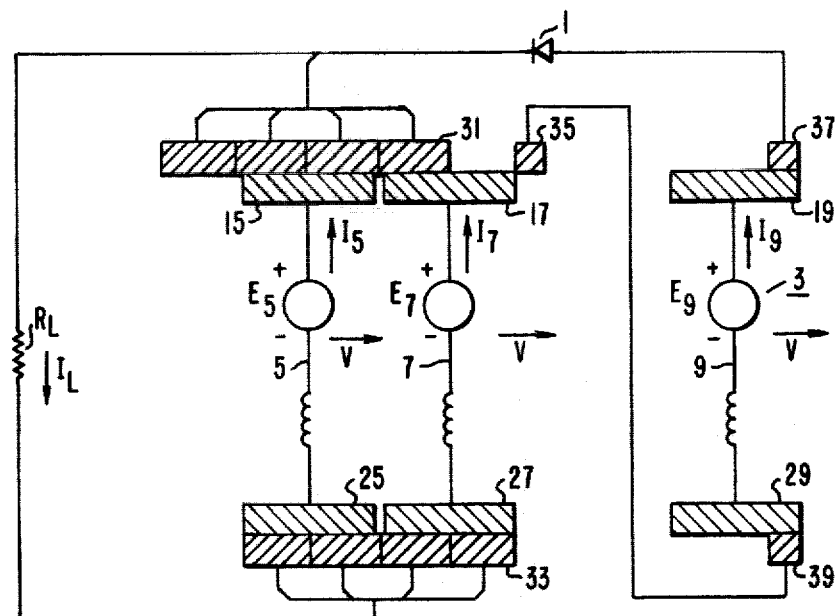
FIG. 1 is a schematic diagram of a DC rotor and switching circuit made in accordance with this invention.
Figure 2:
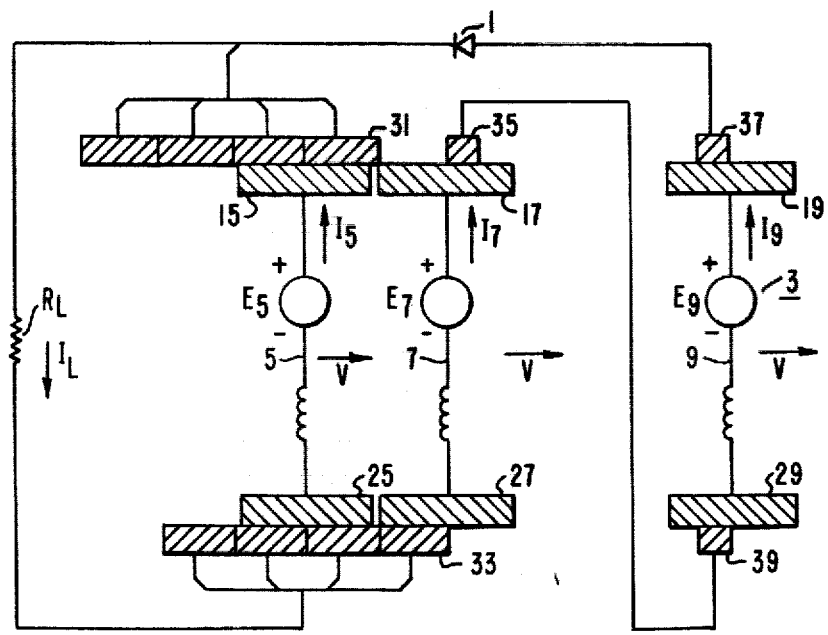
FIGS. 2 and 3 are the same schematic diagram at different time intervals or rotor positions.
Figure 3:
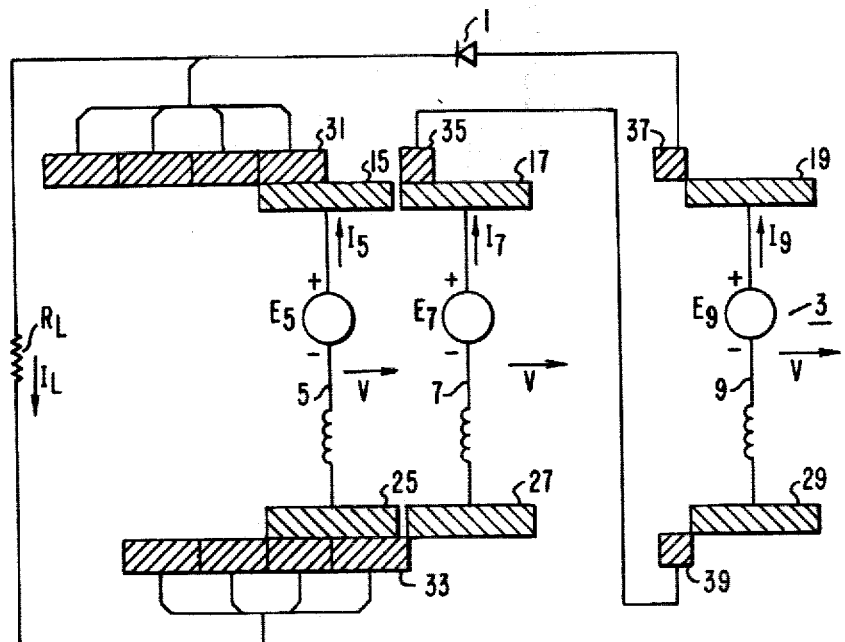

Referring now to the drawings in detail and in particular to FIGS. 1 through 3, there is shown schematically a switching circuit for a DC dynamoelectric machine in which high currents generally in the range of 1,000 to 2,000 amps per square inch are transferred through sliding contact commutation with low voltage drops of less than 200 millivolts.

The switching circuit for reducing edge arcing of the brushes as they leave the collector bars comprises a high current rectifier 1 connected in series with a source of electromotive force generally indicated at 3 which produces a current that is forced to zero by a rapidly decreasing electromotive force as the brush separates from the collector bar. The source of electromotive force may be obtained outside the machine, however, in the preferred embodiments conductors in the pole fringe field are utilized to produce the desired electromotive force.

FIG. 1 schematically shows a portion of a rotor of a dynamoelectric machine having conductors 5, 7 and 9 disposed therein so as to pass through a flux field produced by poles in the stator (not shown). An electromotive force or voltage hereinafter called an emf is represented by $E_5$, $E_7$ and $E_9$, respectively produces currents $I_5$, $I_7$, and $I_9$ in the conductors 5, 7 and 9 as they move at the velocity V. The impedance of a load is indicated by $R_L$ and the current flowing through the load is indicated by $I_L$. Collector bars 15 and 25, 17 and 27, and 19 and 29 are shown electrically connected to the conductors 5, 7 and 9, respectively.

A multi-element main brush 31 is shown contacting the collector bar 17 and a multi-element main brush 33 is shown contacting the collector bar 27.

An auxiliary brush 35 is shown in contact with the collector bar 17 and physically isolated from the brush 31. The auxiliary brush 35 is also electrically connected to the auxiliary brushes 37 and 39, which are shown contacting the collector bars 19 and 29, respectively.

A series circuit is formed comprising the auxiliary brushes 35, 37 and 39, the collector bars 17, 19, 29 and the conductor 9, the brush 31 and the rectifying means 1. The conductor 9 is chosen so that as the trailing edge of the brush 31 approaches the trailing edge of the conductor bar 17, a current $I_9$ is established in the series circuit. This current is forced to zero by a rapidly diminishing emf $E_9$ produced in the conductor 9 by a pole fringe field as the brush 31 separates from the collector bar 17.

FIG. 2 shows the circuit during the time interval in which the current $I_7$ or $I_9$ is diminishing. FIG. 3 shows the circuit as the brush is about to separate from the collector bar 17.

As shown in FIG. 2, the switching sequence wherein the collector bar current $I_7$ is turned off, begins when the collector bar 17 is contacted by the auxiliary brush 35. The auxiliary brushes 37 and 39 have made contact with the collector bars 19 and 29, respectively and have advanced approximately one-half of a collector bar pitch. The current $I_7$ from the conductor 7 now follows the path through the series circuit comprising the auxiliary brushes 35 and 39, the conductor 9 and the rectifying means 1. This current path can only be followed if the emf in the conductor 9 is greater than the sum of the forward voltage drop of the rectifying means 1 and the resistive voltage drops in the auxiliary current path. Since the auxiliary brush 35 is physically isolated from the brush 31, the current $I_7$ may be forced to zero by reducing the emf $I_9$ to zero as the conductors 7 and 9 move a half pitch of the collector bars. The emf $E_9$ may be controlled by a separate interpole central winding or by careful placement of the brushes 37 and 39 on collector bars of a conductor in the fringe region of the main pole.

In the circuit illustrated in FIG. 1, the auxiliary brush current $I_9$ produces useful torque. However, the power loss associated with the forward bias rectifying means 1 may be an appreciable portion of the power generated per conductor and the rectifier conduction period should therefore be minimized. This may be accomplished by choosing a conductor 9 in which the polarity of the emf $E_9$ reverses just as the collector bar 17 separates from the brush 31. Energy stored in leakage inductances $L_1$ and $L_2$ will be absorbed during the switching interval by the forward biased emf of the rectifier 1 and the opposing emf $E_9$, which cooperates to oppose current flowing through the rectifier 1 and through the circuit. Stored inductive energy is thus consumed in the dissipation of the rectifier 1 and rotational motor torque produced in the conductor 9.

Figure 4:
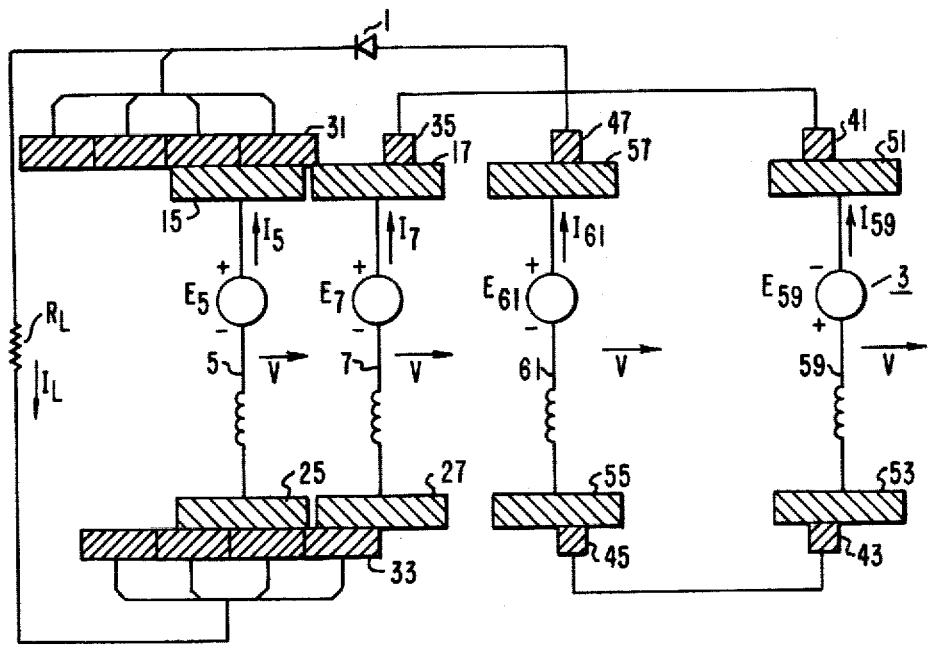
FIG. 4 is a schematic drawing of an alternate switching circuit.

FIG. 4 shows an alternate embodiment in which the circuit embodies a rectifying means 1, and 5 auxiliary brushes 35, 41, 43, 45 and 47, which respectively contact the collector bars 17, 51, 53, 55 and 57. The collector bars 51 and 53 are connected to the conductor 59 which produces a current $I_{59}$ and an emf $E_{59}$ while the auxiliary brushes 55 and 57 are electrically connected to the conductor 61 which produces a current $I_{61}$ and electromotive and emf $E_{61}$. The auxiliary brushes are electrically connected in series in the order in which they are numbered and auxiliary brush 47 is serially connected to the rectifying means 1. This particular embodiment has the advantage of eliminating long leads required in the other embodiment.

The switching circuits hereinbefore described have the following features:

Auxiliary brushes isolated from the main brushes such that a low impedance path is provided for current in the collector bar, which is undergoing separation from the main brush.

The high current rectifying means 1, is connected in series with the source of emf, a conductor in the fringe region, to prevent reverse flow of current in the circuit, when the current flowing therein is forced to zero.

The circuit, in order to effectively shunt trailing edge switching current must provide an auxiliary emf to overcome the forward drop of the rectifying means as well as an additional resistance in the interconnecting auxiliary leads.

After the main brush separates from the collector bar, the circuits emf is reduced either by the conductor moving through a reduced field region or by a flux change in the conductor produced by separate interpole windings or a combination thereof.

Finally, stored inductive energy in the circuit is dissipated in the rectifying means or delivered as useful power to the load.

This switching circuit for absorbing switching energy in a high current low voltage DC dynamoelectric machine permits the utilization of any type of low resistance brushes at high current densities without the undesirable degradation of the brushes and collector bars. Positive control of the switching utilizing electrical connection to auxiliary circuits within the machine enhances the reliability and improves the consistency of machine performance.

It is understood that even though the preferred embodiment has been described in terms particularly applicable to DC generators, this invention is applicable to DC motors as well as DC generators.

What is claimed is:

1. A switching circuit in a DC dynamoelectric machine having a stator and a rotor, conductors in said rotor electrically connected to collector bars, and brushes which intermittently make electrical and physical contact with said collector bars, said switching circuit comprising a first collector bar disposed in the rotor; a first brush disposed to contact said first collector bar; a first auxiliary brush disposed to contact said first collector bar before said first brush separates therefrom; rectifying means electrically connected in a series circuit with said first brush and said first auxiliary brush; and a source of electromotive force which produces a current in said series circuit which is generally equal to the current flowing between said first collector bar and said first brush and which generally forces said current between said first collector bar and said first brush to zero as said first brush separates from said first collector bar.

2. A switching circuit as set forth in claim 1 and further comprising a second brush; a second collector bar; said first and second collector bars being connected to one of said conductors in said rotor; said first and second brushes being disposed so that the first brush always separates from said first bar before said second brush separates from said second collector bar.

3. A switching circuit as set forth in claim 2 and further comprising a third collector bar; a fourth collector bar; said third and fourth collecting bars being connected to a conductor disposed in said rotor so as to produce said electromotive force; and a second and third auxiliary brush disposed in contact with said third and fourth collector bars when said first auxiliary brush is contacting said first collector bar.

4. A switching circuit as set forth in claim 2 and further comprising a third and fourth collector bar connected to a conductor in the rotor; a fifth and sixth collector bar connected to a conductor in said rotor; a second auxiliary brush electrically connected to said first auxiliary brush and disposed to contact said fifth collector bar generally when the first auxiliary brush contacts said first collector bar, a third and fourth auxiliary brush electrically connected and disposed to respectively contact said sixth and fourth collector brushes generally when said first collector brush contacts said first collector bar; a fifth auxiliary brush electrically connected in series with said rectifying means and disposed to contact said third collector bar generally when said first auxiliary brush contacts said first collector bar; said conductors between said third and fourth collector bars and said fifth and sixth collector bars providing said source of electromotive force.

* * * * *